(12) United States Patent
Low et al.

(10) Patent No.: US 9,273,240 B2
(45) Date of Patent: Mar. 1, 2016

(54) METHOD FOR PREPARING A TERNARY OR HIGHER ZEOTROPIC REFRIGERANT MIXTURE

(75) Inventors: Robert E. Low, Cheshire (GB); Stuart Corr, Cheshire (GB)

(73) Assignee: MEXICHEM AMANCO HOLDING S.A. DE C.V., Viveros del Rio, Tlalnepantla (MX)

( * ) Notice: Subject to any disclaimer, the term of this patent is extended or adjusted under 35 U.S.C. 154(b) by 141 days.

(21) Appl. No.: 13/983,751

(22) PCT Filed: Feb. 14, 2012

(86) PCT No.: PCT/GB2012/050328
§ 371 (c)(1),
(2), (4) Date: Sep. 24, 2013

(87) PCT Pub. No.: WO2012/110801
PCT Pub. Date: Aug. 23, 2012

(65) Prior Publication Data
US 2014/0021399 A1    Jan. 23, 2014

(30) Foreign Application Priority Data
Feb. 16, 2011 (GB) .................................. 1102691.1

(51) Int. Cl.
*C09K 5/04* (2006.01)

(52) U.S. Cl.
CPC ............ *C09K 5/045* (2013.01); *C09K 2205/106* (2013.01); *C09K 2205/126* (2013.01); *C09K 2205/34* (2013.01)

(58) Field of Classification Search
CPC .......... C09K 5/04; C09K 5/044; C09K 5/045; C09K 2205/106
USPC .......................................................... 252/67
See application file for complete search history.

(56) References Cited

U.S. PATENT DOCUMENTS

| 7,914,696 | B2* | 3/2011 | Low ......................... C08J 9/146 134/36 |
| 8,628,681 | B2* | 1/2014 | Low ......................... C08J 9/127 134/36 |
| 2004/0031538 | A1 | 2/2004 | Richard et al. |
| 2011/0162410 | A1* | 7/2011 | Low ................................ 62/532 |

FOREIGN PATENT DOCUMENTS

| EP | 0 767 348 A1 | 4/1996 |
| EP | 0 856 571 A2 | 1/1998 |
| JP | 2001-141193 | 5/2001 |

OTHER PUBLICATIONS

International Search Report for Int'l Application No. PCT/GB2012/050328, date of actual completion Jun. 25, 2012, 3 pgs.
Written Opinion of the International Preliminary Examining Authority for Int'l Application No. PCT/GB2012/050328, date of mailing Jan. 28, 2013, 5 pgs.
Written Opinion of the International Search Authority for Int'l Application No. PCT/GB2012/050328, 3 pgs.

* cited by examiner

*Primary Examiner* — Douglas McGinty
(74) *Attorney, Agent, or Firm* — Brinks Gilson & Lione

(57) ABSTRACT

A method for preparing a ternary or higher zeotropic refrigerant mixture comprising components of different volatilities is described. The method comprises: mixing together the less volatile components of the mixture in a pre-blending process; and separately adding the most volatile component to the pre-blended mixture by pressure or mass flow control so that the desired initial liquid composition is attained. The liquid zeotropic refrigerant mixture that is prepared may be transferred from a container in which it is held to another container or to a piece of equipment that is to use the refrigerant mixture. This method comprises the steps of: removing at least a portion of the prepared liquid zeotropic refrigerant mixture from a container in which it is held; charging the liquid zeotropic refrigerant mixture that is removed to another container or to a piece of equipment in which it is to be used; and adding at least the most volatile component of the refrigerant mixture to the holding container to compensate for the removal of liquid refrigerant mixture therefrom.

12 Claims, 1 Drawing Sheet

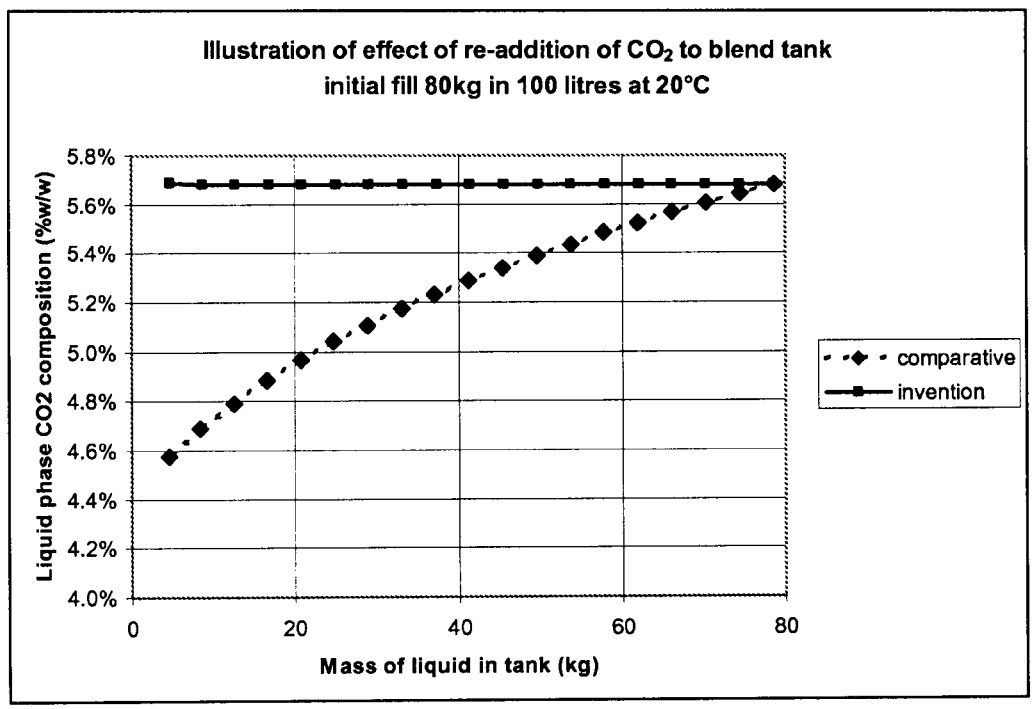

METHOD FOR PREPARING A TERNARY OR HIGHER ZEOTROPIC REFRIGERANT MIXTURE

CROSS-REFERENCE TO RELATED APPLICATIONS

This application is the U.S. National Phase under 35 U.S.C. §371 of International Application No. PCT/GB2012/050328, filed Feb. 14, 2012, designating the United States and published in English on Aug. 23, 2012, as WO 2012/110801, which claims priority to United Kingdom Application No. 1102691.1, filed Feb. 16, 2011, which is incorporated by reference in its entirety.

FIELD

The present invention relates generally to the field of refrigeration and, more particularly, to a method for preparing and handling wide-glide, zeotropic refrigerant mixtures which allows such mixtures to be prepared and then transferred from a storage container or vessel to another vessel or to a piece of refrigeration equipment without any significant compositional change.

BACKGROUND

The majority of refrigeration, air conditioning and heat pump equipment employed today uses the subcritical vapour compression cycle to transfer heat from a colder region to a hotter region via the low pressure evaporation and high pressure condensation of a refrigerant fluid. The refrigerants in current commercial use are either: single fluids, for example 1,1,1,2-tetrafluoroethane (R-134a); azeotropic mixtures, for example the azeotropic mixture of 1,1,1-trifluoroethane (R-143a) and pentafluoroethane (R-125) sold as R-507; or non-azeotropic ("zeotropic") mixtures in which the temperature glide, i.e. the difference between the bubble and dew point temperatures of the refrigerant mixture at atmospheric pressure, is relatively narrow, typically less than about 10° C. Examples of the latter include the 50:50 w/w mixture of difluoromethane (R-32) and R-125 sold as R-410A (glide less than 0.1° C.) and the 23:25:52 w/w mixture of R-32, R-125 and R-134a sold as R-407C (glide 7° C.). It has been found and accepted that all three types of refrigerant can be handled with the same kind of servicing equipment and generally used in a similar manner, with the proviso that mixed refrigerants should be transferred from the cylinder in which they are stored to the equipment as a liquid to preserve the composition.

The fluorocarbon based refrigerants in current use have relatively high Global Warming Potentials (GWP), expressed in terms of their ability to trap heat in the atmosphere on a relative scale where 1 kg of $CO_2$ is taken as having a GWP of 1. For example, using the internationally accepted IPCC AR-4 (Intergovernmental Panel on Climate Change—Fourth Assessment Report) values of halocarbon GWPs; R-134a has a GWP of 1430; R-410A has a GWP of 2088; and R-407C has a GWP of 1774.

The environmental impact on the climate of operating a refrigeration, air conditioning or heat pump system can be expressed as an equivalent emission of $CO_2$ greenhouse gas resulting from operation or servicing of the unit. The total equivalent warming impact (TEWI) of a system is a measure of this emission expressed as a sum of direct emission—the equivalent amount of $CO_2$ represented by leakage of a refrigerant having a GWP—and the indirect effect, namely the $CO_2$ emitted as a consequence of generating mechanical or electrical power to operate the unit, either by direct combustion of fuel (e.g. for automobile air conditioning) or by combustion of fuel in a power station to generate electricity.

Reduction of the GWP of the refrigerants used in such vapour compression technology therefore offers a means of reducing the overall TEWI of the technology. This is already mandated in Europe by the European Union MAC Directive for the specific application of refrigerants in automotive air conditioning. Refrigerant R-134a is currently used worldwide in automotive air conditioning systems. Under the MAC directive its use in new cars will progressively be replaced by a fluid or fluid compositions having a GWP of less than 150 over the period 2011-2017.

In the search for alternatives to the currently used refrigerant fluids, it is evident that in at least some applications those fluids will not easily be replaced by single fluids having comparable refrigerant properties without other complications arising from the other properties of the replacement fluids. The most significant of these is flammability—many molecules otherwise suitable for refrigeration applications and having low GWP are flammable.

For example, chlorodifluoromethane (R-22) (an ozone depleting fluid with a GWP of ~1800) could be replaced from a technical standpoint by propane (GWP of 3), as the key physical properties relevant to refrigeration performance (principally boiling point and vapour pressure) are similar for the molecules. However, propane is extremely flammable whereas R-22 is non-flammable, and its flammability would preclude it from use in many applications serviced by R-22.

Therefore, it is potentially necessary in the search for new refrigerants having lower GWP to contemplate mixing refrigerant components to form a refrigerant blend having the desired balance of properties including: good refrigeration performance in the application, low flammability, low toxicity, low GWP and technical suitability for the application demands.

One class of mixtures, not currently in widespread use, which may offer promise is that of so-called wide-glide zeotropic refrigerant mixtures. These are mixtures having a temperature glide significantly larger than those exhibited by the currently used zeotropic refrigerants, e.g. a temperature glide of greater than 10° C. or perhaps greater than 15° C. Non limiting examples of such mixtures include:

Mixtures of carbon dioxide with hydrofluoroalkene fluids, such as 2,3,3,3-tetrafluoropropene (R-1234yf), 1,3,3,3-tetrafluoropropene (R-1234ze—E or Z isomers or mixtures thereof), 3,3,3-trifluoropropene (R-1243zf), 1,2,3,3,3-pentafluoropropene (R-1225ye—E or Z isomers or blends thereof), 1-chloro trifluoropropene (R-1233zd—E or Z isomers), 2-chloro 3,3,3-trifluoropropene (R-1233xf), hexafluorobutene (R-1336—all isomers), octafluoropentene (R-1438—all isomers and especially 1,1,1,4,4,5,5,5-octafluoro-2-pentene (R-1438m/z)), nonafluoropentene (R-1429—all isomers and especially 1,1,1,2,4,4,5,5,5-nonafluoro-2-pentene (R-1429myz) and 1,1,1,3,4,4,5,5,5-nonafluoro-2-pentene (R-1429mzy) and the like.

Mixtures as above additionally containing other saturated fluorocarbon refrigerant compounds, such as R-125, R-32, R-134a, fluoroethane (R-161), R-143a, 1,1,1-trifluoropropane (R-263fb), 1,1-difluoroethane (R-152a) and 1,1,1,2,3,3,3-heptafluoroethane (R-227ea), or hydrocarbons, such as propane, propylene, n-butane, isobutane, or dimethyl ether.

Mixtures of low boiling point fluorocarbon or hydrocarbon fluids with hydrofluorocarbon or hydrochlorofluorocarbon fluids having significantly higher boiling points, for example mixtures comprising R-32 (boiling point −51° C.) with other halogenated refrigerant fluids having boding points higher than R-134a.

For zeotropic refrigerant blends, compositional shifts arise as the liquid blend is discharged from the container in which it is stored. As the liquid refrigerant blend is removed from the container, the space above the liquid refrigerant increases allowing it to accommodate more vapour. However, for zeotropic blends, the more volatile refrigerant component evaporates preferentially, so that the vapour space above the liquid becomes occupied with a vapour composition that becomes progressively enriched in the more volatile component. Correspondingly, the liquid refrigerant that remains in the storage container becomes gradually depleted in the more volatile component as more and more of the liquid is removed from the container. This behaviour is known as composition shift.

In automotive air conditioning systems, SAE standard J1658 requires that the performance of a mixed refrigerant be evaluated across the range of compositions that develop during depletion of a cylinder containing the mixed refrigerant from full to empty. This standard requires the change in cooling capacity resulting from the compositional change to be less than 5% over the range.

The zeotropic refrigerant mixtures in use today, such as R-407C, have relatively narrow temperature glides. These mixtures are conventionally manufactured by a batch wise blending operation in which the components are added to a bulk blending tank in reverse order of volatility. Optionally, recirculation of the liquid contents of the tank is used to ensure good mixing of the components. On completion of the blending process the tank contains a liquid refrigerant phase and a vapour refrigerant phase. The compositions of the two phases are different for a zeotropic mixture, with the vapour phase containing more of the more volatile components than does the liquid phase. The relative amounts of each component added in this batch wise blending process are selected to ensure that the liquid phase meets the target composition specification.

Once the bulk blending operation is complete, the refrigerant is transferred into smaller cylinders or tanks by withdrawal of liquid from the bulk blending tank. As explained supra, as this withdrawal occurs, the proportion of the more volatile species in the liquid phase is progressively depleted. This effect is illustrated in European patent EP-B-0,767,348 assigned to Daikin Industries, which deals with the handling and packing of R-407C compositions. For R-407C, the patent attends to the problem of composition shift by initially placing a composition enriched in R-32 in the blending vessel so as to ensure that throughout the process of liquid removal, the content of R-32 in the liquid stays within specification, despite the preferential evaporation of the more volatile R-32 into the increasing vapour space volume as liquid is removed.

This technique may, however, be insufficient to allow zeotropic mixtures having large glides, such as the zeotropic mixture of $CO_2$, R-134a and R-1234ze(E), to be handled so that the liquid composition delivered from a blending vessel stays within specification.

Furthermore, when a zeotropic refrigerant blend is registered with the American Society of Heating, Refrigeration and Air Conditioning Engineers (ASHRAE), it will have tolerance limits for each component in the blend. For example, for R-407C, there is a ±2 weight % tolerance on each component in the blend. These tolerance limits must be observed during the subsequent use of the blend. This need to observe and control composition specification can present a problem with wide-glide zeotropic refrigerant mixtures, as the compositional shift that results as liquid is removed from the cylinder can eventually take the liquid refrigerant out of specification.

SUMMARY

It is an object of the present invention to provide an effective method of manufacturing ternary or higher zeotropic refrigerant blends. The present invention is particularly concerned with the preparation of wide-glide zeotropic refrigerant blends having a low GWP and acceptable flammability characteristics.

It is an additional object of the present invention to address the problem of composition shift that arises when handling and using ternary or higher zeotropic refrigerant blends. The present invention is particularly concerned with the effective management of composition shift for wide-glide zeotropic refrigerant blends having a low GWP and acceptable flammability characteristics, so that the composition that is delivered to the end-use equipment is within specification.

Accordingly, the present invention provides a method for preparing a ternary or higher zeotropic refrigerant mixture comprising components of different volatilities and preferably a ternary or higher zeotropic refrigerant mixture that comprises $CO_2$, at least one hydrofluoroalkene, especially at least one hydrofluoropropene, and optionally at least one further fluorocarbon or hydrocarbon compound, such as a fluorocarbon or hydrocarbon compound as discussed above. The method comprises: mixing together the less volatile components of the mixture in a pre-blending process; and separately adding the most volatile component to the pre-blended mixture by pressure or mass flow control so that the desired initial liquid composition is attained. These steps will be conducted in some form of blending container or tank, which will typically be fitted with equipment for mixing the components together, such as a stirrer.

The preparative method may be conveniently conducted in an assembly plant location.

BRIEF DESCRIPTION OF THE DRAWING

FIG. 1 shows the effect of re-addition of $CO_2$ to a blend tank on the estimated $CO_2$ composition in the liquid phase throughout depletion of the tank.

DETAILED DESCRIPTION

For a ternary or higher zeotropic refrigerant that comprises $CO_2$, at least one hydrofluoroalkene and optionally one or more further fluorocarbon or hydrocarbon compounds, the least volatile compounds are selected from the hydrofluoroalkenes and optionally from the additional fluorocarbon or hydrocarbon compounds. The most volatile compound is $CO_2$.

Taking the $CO_2$/R-134a/R-1234ze(E) mixture for illustration, the R-134a and R-1234ze(E) components could be pre-blended to form a precursor mixture at a refrigerant production facility, then transported to an assembly plant producing air conditioning or refrigeration equipment, and there added to a master blend tank. $CO_2$ could then be separately blended into this tank to give the desired composition directly at the equipment assembly line.

The present invention also provides a method for preparing a ternary or higher zeotropic refrigerant mixture comprising components of different volatilities and then transferring the prepared mixture from a container in which it is held to another container or to a piece of equipment that is to use the refrigerant mixture. The method comprises the steps of: mixing together the less volatile components of the mixture in a pre-blending process; separately adding the most volatile component to the pre-blended mixture by pressure or mass flow control so as to obtain a desired initial liquid composition of the zeotropic refrigerant mixture; removing at least a portion of the prepared liquid zeotropic refrigerant mixture from a container in which it is held; charging the liquid zeotropic refrigerant mixture that is removed to another container or to a piece of equipment in which it is to be used; and adding at least the most volatile component of the refrigerant mixture to the holding container to compensate for the removal of liquid refrigerant mixture therefrom. Preferably, just the most volatile component is added to the holding container.

In the above method, the ternary or higher zeotropic refrigerant mixture is preferably a ternary or higher zeotropic refrigerant mixture that comprises $CO_2$, at least one hydrofluoroalkene, especially at least one hydrofluoropropene, and optionally at least one further fluorocarbon or hydrocarbon compound, such as a fluorocarbon or hydrocarbon compound as discussed above.

The preparation of the zeotropic refrigerant mixture will be conducted in some form of blending container or tank, which will typically be fitted with equipment for mixing the components together, such as a stirrer or a liquid jet recirculation system. The holding container from which the liquid zeotropic refrigerant mixture is removed for transfer to another container or to a piece of refrigeration equipment in which it is to be used may be the blending tank in which the refrigerant mixture was made or some other storage vessel. The liquid zeotropic refrigerant mixture may be removed from the holding container either continuously or incrementally.

The present invention further provides a method for controlling the composition of a liquid zeotropic refrigerant mixture stored in a container so that the liquid zeotropic refrigerant mixture that remains in the container continues to satisfy a target specification as the liquid mixture is removed from the container for charging to another vessel or to a piece of equipment, said method comprising adding at least the most volatile component of the refrigerant mixture to the container to compensate for the removal of liquid refrigerant mixture from the container. Preferably, just the most volatile component is added to the container.

Also provided is a method for transferring a liquid zeotropic refrigerant mixture stored in a container to another container or to a piece of equipment that is to use the refrigerant mixture, said method comprising the steps of: removing at least a portion of the liquid zeotropic refrigerant mixture from the container in which it is stored; charging the liquid zeotropic refrigerant mixture that is removed to the other container or to the piece of equipment; and adding at least the most volatile component of the refrigerant mixture to the storage container to compensate for the removal of liquid refrigerant mixture therefrom. Preferably, just the most volatile component is added to the storage container. This method allows the composition of the liquid zeotropic refrigerant mixture in the storage container to be managed, so that it continues to satisfy a target specification as the liquid mixture is removed. The liquid zeotropic refrigerant mixture may be removed from the storage container continuously or incrementally.

The methods of the present invention are applicable to the transfer of a liquid refrigerant material from a bulk blending/manufacturing vessel to a smaller storage container or from any sized storage container to end use equipment. Thus, by a container, we include bulk blending/manufacturing vessels as well as smaller storage containers that are used to transport the refrigerant blend from the site of manufacture to the place of use.

In one embodiment, the methods comprise periodic addition of at least the most volatile component of the refrigerant mixture to the container following removal of one or more aliquots of the liquid zeotropic refrigerant mixture from the container. For example, a suitable amount of the most volatile component or components may be added to the container to return the liquid refrigerant mixture to the desired composition after every liquid aliquot has been removed from the container.

As a zeotropic refrigerant composition that is within specification will have a particular vapour pressure or vapour pressure range in the container at the locally prevailing ambient temperature which will either be known or can be determined, it is possible to know how much of the most volatile refrigerant component to add after a sample of the liquid refrigerant mixture is removed by adding just sufficient of the most volatile component to return the pressure in the container to a pressure that matches the particular vapour pressure or which falls within the vapour pressure range that is exhibited by the zeotropic refrigerant composition when it is within specification. This can be done prior to removal of the next aliquot of the liquid refrigerant blend.

The present methods are particularly directed at maintaining wide-glide, zeotropic refrigerant blends within specification as aliquots of the wide-glide, liquid refrigerant blend are removed from a container or vessel in which the wide-glide blend is stored. By a wide-glide refrigerant blend we are referring to a blend that has a temperature glide that is wider than the currently used zeotropic refrigerant blends, such as R-407C, which have temperature glides less than about 10° C. By temperature glide, we are referring to the difference between the bubble and dew point temperatures of the refrigerant blend at atmospheric pressure. The wide-glide refrigerant mixtures with which the present invention is particularly concerned would tend to move out of specification using the methods of handling that are suitable for fluids such as R-407C. More particularly, by wide-glide refrigerant blends we are referring to blends that have a temperature glide that is greater than 10° C., e.g. greater than 15° C. or even greater than 20° C.

The present invention is more particularly directed at maintaining wide-glide, liquid refrigerant blends that contain carbon dioxide within specification as aliquots of the liquid refrigerant blend are removed from a container or vessel in which the blend is stored. More particularly, the present invention is applicable to blends comprising mixtures of carbon dioxide and one or more hydrofluoroalkene fluids, especially one or more hydrofluoropropene fluids. Suitable hydrofluoroalkenes are selected from R-1234yf, R-1234ze (E or Z isomers), R-1243zf, R-1225ye (E or Z isomers), R-1233zd (E or Z isomers), R-1233xf, R-1336 (all isomers), R-1438 (all isomers) and R-1429 (all isomers). The blends are preferably ternary mixtures.

The blends of carbon dioxide and the one or more hydrofluoroalkenes, e.g. hydrofluoropropenes, may additionally comprise one or more other saturated fluorocarbon refrigerant compounds and/or one or more hydrocarbons. Suitable fluorocarbon refrigerant compounds include R-125, R-32, R-134a, R-161, R-143a, R-263fb, R-152a and R-227ea. Suitable hydrocarbons include propane, propylene, n-butane, isobutane, and dimethyl ether. Where an additional fluorocarbon or hydrocarbon compound is included, the blends are preferably ternary or quaternary mixtures.

For refrigerant blends comprising $CO_2$ and a hydrofluoroalkene, optionally together with another refrigerant component, e.g. a blend containing $CO_2$, R-1234ze(E) and R-134a, the most volatile component is $CO_2$ and in these cases it is possible to add just $CO_2$ to the holding container to return the liquid refrigerant phase to the desired composition after every liquid aliquot had been removed. The addition of the $CO_2$ can be continued until the pressure in the vessel is returned to a target value prior to removal of the next aliquot of liquid refrigerant. By a target value, we mean a pressure that matches a pressure or that falls within a pressure range exhibited by the refrigerant blend when it is within specification.

In another embodiment, the method comprises continuous addition of the most volatile component to the container while the liquid refrigerant is being removed by using a regulating valve connected to a supply of the component. The opening of the regulating valve may be controlled by a suitable feedback controller and pressure transducer arrangement or the regulating valve may be a mechanical pressure regulating valve to ensure that the total pressure in the bulk container stays substantially constant. Alternatively, the regulating valve may be controlled by a mass flow meter to allow accurate titration of the component into the tank and provide a direct measure of the contents.

The references herein to a specification for the zeotropic refrigerant blend refer to a composition for the blend which is deemed to be appropriate for the blend in terms of its performance characteristics when in use in equipment. This composition can be variable, within limits. Typically, the specification includes a notional or optimal composition for the blend comprising specific amounts (in terms of weight) of each component and upper and lower tolerance limits around these specific amounts, such as ±2 weight % or ±1 weight %. Thus, the specification includes the nominal composition as well as all compositions that fall within the tolerance limits defined around the nominal composition. For example, for a blend comprising say 20 weight % of A, 20 weight % of B and 60 weight % of C, the target specification could be 20±2 weight % of A, 20±2 weight % of B and 60±2 weight % of C. For such a blend, the target value for the pressure would be a pressure exhibited by a blend having the nominal composition or a composition that falls with the above tolerance limits. Usually the specification for a zeotropic refrigerant blend will be set by a standard setting body such as ASHRAE.

For ternary or higher zeotropic refrigerant blends comprising components that divide into low, high and intermediate volatility/boiling point, it may, in some cases, also be desirable or necessary to adapt the method of the invention by also adding the intermediate volatility component(s) comprised in the blend to the container to compensate for the liquid refrigerant blend removed, so as to ensure the overall composition in the liquid phase is maintained within acceptable tolerances. This may be accomplished by addition of specified amounts of the intermediate volatility component(s) after each step or by continuous feed using a mass flow controller device to regulate the flow of intermediate component(s) into the container.

In order to ensure rapid equilibration of the phases, it may be desirable to sparge the most volatile component and optionally any intermediate volatility components into the liquid phase via a sparging nozzle or manifold (generating a dispersion of bubbles of vapour) and thereby promote rapid mass transfer into the liquid phase. Similarly it may be desirable to recirculate a portion of liquid in the container, with the circulating liquid being sprayed into the vapour space of the tank as a droplet spray, again to promote mass transfer. Such recirculation and sparging processes would normally be stopped a short time prior to a liquid refrigerant removal step.

At the end of the liquid removal process, the composition of the vapour phase that remains in the container will be significantly enriched in the most volatile component compared to the initial vapour phase composition. Depending on the size of the container and the intended maximum liquid fill, it may be necessary to wholly or partially remove the enriched vapour composition from the container in order to ensure that the next batch of liquid refrigerant prepared has the desired initial composition. This can be achieved by withdrawing the vapour through a refrigerant reclaim unit, or venting to a suitable disposal system. This optional vapour purging step is also part of the invention. If the composition comprises $CO_2$ and if the vapour is vented through a refrigerant recovery system, then the $CO_2$ may be discharged to atmosphere from the recovery system but the remaining refrigerant components may be recovered and re-used, either in preparation of a further batch or by return to the refrigerant supplier for further separation into components.

The present invention is now illustrated but not limited by the following examples.

A blend comprising 6 weight % $CO_2$, 10 weight % R-134a and 84 weight % R-1234ze(E) was investigated to determine whether the blend is affected by composition shift, and if so, whether the problem can be ameliorated by using the method of the present invention. The blend is a potential replacement for R-134a in automotive air conditioning applications.

The investigation was conducted using the NIST REFPROP software, version 8.0, linked into Microsoft Excel, to provide thermodynamic and phase equilibrium properties of the $CO_2$/R-134a/R-1234ze(E) system using the Span-Wagner equation of state for refrigerant mixture properties. The REFPROP software allows calculation of liquid and vapour compositions that will be present in a system of known overall composition, charge mass, vessel volume and temperature, using the so-called isochoric flash routine.

In more detail, measurements of liquid and vapour density, saturated liquid vapour pressure, liquid and vapour enthalpy and the measured critical point together with estimations of ideal gas enthalpy generated using the Hyperchem 7.5 software were used to define a Span-Wagner thermodynamic property model for R-1234ze(E) refrigerant. Then experimentally derived measurements of binary phase equilibrium properties for R-1234ze(E) with $CO_2$, R-1234ze(E) with R-134a and R-134a with $CO_2$ were regressed to provide compositional mixing rules to represent the phase equilibrium behaviour of the system. The standard reference textbook "The Properties of Gases and Liquids" $5^{th}$ edition (B E Poling, J M Prausnitz, J O'Connell, pub McGraw-Hill) describes the principles behind such phase equilibrium measurements. The standard reference text Multiparameter Equations of State: An Accurate Source of Thermodynamic Property Data by R Span (pub Springer-Verlag) describes in more detail the Span-Wagner thermodynamic equation of state.

The binary phase equilibrium data for R-1234ze(E) with $CO_2$ and with R-134a were measured using a combination of static-synthetic and static-analytic techniques.

For the static-synthetic VLE measurements generating isothermal pressure-composition data at −40 and +10° C. a static apparatus was used. In this procedure, the pressure of different overall compositions is measured at constant temperature. The thermostatted, purified and degassed compounds (liquids or liquefied gases) were charged into a vessel of accurately known volume, which was evacuated and placed in a thermostatic oil bath. The pressure inside the cell was monitored with a pressure sensor (model PDCR 4010, GE Sensing, range 0 to 1.5 MPa). The pressure sensor was calibrated with a pressure balance (model 8000S or 21000, D&H). The temperature was measured with a Pt100 resistance thermometer (model 1502A, Hart Scientific). The total compositions were determined from the known quantities of liquids injected into the equilibrium cell by piston injector pumps (model 2200-801, Ruska). The liquid phase compositions were obtained by solving mass and volume balance equations, taking the thermodynamic vapour-liquid equilibrium into account.

For the static-analytic measurements (yielding isothermal pressure and liquid and vapour phase composition data) at 60° C. a magnetically stirred equilibrium cell made of Hastelloy C-276 was used. The thermoregulation of a sample cell of accurately known volume was performed with a metal jacket heated electrically or with an external liquid circulation thermostat enabling the temperature to be constant within ±0.05 K. The pressure inside the cell was monitored with a calibrated pressure sensor (model PDCR 4010, GE Sensing, range 0 to 3.5 MPa), and the temperature was measured with a Pt100 resistance thermometer (Model 1502A, Hart Scientific) inside the metal body of the cell. The estimated accuracy for the pressure measurement is (±0.0005×Pressure [Pa]+100 Pa). In this device, known quantities of substances (liquids, liquefied gases, or gases) were injected into the cell using piston injector pumps (Model 2200-801, Ruska) or gas storage containers, respectively. Moreover, after equilibration and phase settling samples were taken from the phases and analyzed by gas chromatography. Small amounts of the substances were directly injected into the carrier gas stream using a pneumatically driven micro sampler (ROLSI: rapid on-line sampler-injector). The complete cell can be turned so that the cusp of the sampling capillary is immersed in the desired phase. For this purpose, the cell is equipped with sapphire windows which are sealed with PTFE. Because of the very small sample size the equilibrium inside the cell is not disturbed. In order to avoid condensation and adsorption of high boiling components, the micro sampler and the lines for the gas stream of the gas chromatograph were superheated. To enable the sampling, the pressure inside the cell has to be larger than the pressure of the carrier gas stream of the gas chromatograph. For this purpose, at low system pressures an inert component (helium) was added to the cell if required.

The result of this experimental work was a complete thermodynamic model allowing simulation of the handling and transfer of mixtures of $CO_2$/R-134a/R-1234ze(E) and allowing estimation of phase compositions and densities.

EXAMPLE 1

A composition comprising $CO_2$, R-134a and R-1234ze(E) in the proportions 6%, 10% and 84% by weight is prepared in a 100 litre cylinder. The cylinder, initially evacuated to a good vacuum, is located in an average ambient temperature environment of 20° C. and is filled with 80 kg of material such that the initial liquid composition of the tank is at the desired values and the total density of the tank contents is 800 kg/m$^3$ (equivalent to 80 kg in 100 litres volume).

A first binary pre-mixture aliquot of R-134a and R-1234ze (E) is prepared by addition of 8 kg of R-134a and 66.9 kg of R-1234ze(E) to the evacuated cylinder and the liquid contents are circulated to ensure good mixing.

Then $CO_2$ is added by transfer from a storage cylinder as vapour under mass flow control until a total of 5.1 kg has been added to the blending cylinder. The contents are allowed to equilibrate. The $CO_2$ may be withdrawn from its storage cylinder either as a liquid or as a gas. If removed as a liquid, then as it passes into the lower pressure of the blending cylinder, a significant proportion of it will vaporise and cool itself. For this reason it may be desirable to pass the $CO_2$ through a heater coil or other heat exchanger to maintain the temperature at or close to the temperature of the blending cylinder during the transfer.

The composition of the bulk material fed to the vessel above is found to be (expressed by weight and rounded to 1 decimal place): $CO_2$ 6.3%; R-134a 10%; R-1234ze(E) 83.7%.

The composition of the liquid phase is then estimated by using the above bulk composition and the overall bulk density of 800 kg/m$^3$ together with the REFPROP 8.0 calculation routine for estimation of fluid properties and the VLE model developed as described above. It was found that the liquid composition would be 6.0% by weight $CO_2$, 10.0% by weight R-134a and 84.0% by weight R-1234ze(E) as desired (again rounded to 1 decimal place) and that of the 80 kg added approximately 79 kg would be present as liquid.

Comparative Example 2

A refrigerant blend comprising 6 weight % $CO_2$, 10 weight % R-134a and 84 weight % R-1234ze(E) was studied to assess how the liquid composition of the blend when stored in a large batch tank will change as individual samples are withdrawn from the tank to fill individual cylinders or pieces of equipment. This is a simulation of what would be expected to happen either in a cylinder packing plant or at a refrigeration/air conditioning system charging station.

A simulation model was written in Microsoft Excel and linked to the REFPROP calculation engine using the detailed thermodynamic model as described above.

The model was used to simulate initial preparation of a batch of the blend followed by successive removal of known volume samples of liquid. The model assumed that the desired amount of the nominal composition was initially added to the bulk tank and allowed to equilibrate, then successive aliquots of liquid were withdrawn (assumed to be the prevailing bulk liquid composition) with the vessel contents being allowed to re-equilibrate between removals.

The following parameters were used in the modelling:
Blend bulk tank volume: 100 litres
Total blend batch weight: 80 kg
Blending temperature: 20° C.
Sample removal size: 10 kg The calculation was laid out using the ability of REFPROP to calculate the liquid and vapour phase compositions arising from a mixture of known overall composition given the temperature and overall density of material in the system by use of its isochoric flash routine. The approach was as follows:
1. Specify total tank volume and initial filled mass. This gives an effective density ratio (mass divided by volume)
2. Calculate liquid and vapour compositions in equilibrium in the tank from the known density, overall composition and temperature. Also calculate the total amount of the charge which is present as liquid, and calculate liquid and vapour densities.
3. Remove the desired amount of material from the tank, assuming that the mass removed is of the liquid composition, and that no shift in phase compositions occurs during this process.
4. Recalculate the tank density ratio (mass/volume) and recalculate the overall composition using the principles of mass balance.
5. Recalculate liquid and vapour phase compositions in equilibrium using the REFPROP routine.
6. Repeat steps 2-5 until there is no liquid left in the tank.

The table below shows the estimated liquid composition after the successive removal of seven 10 kg liquid samples from the tank.

| Mass in tank (Kg) | $CO_2$ | R134a | R1234ze(E) |
|---|---|---|---|
| 80 | 5.7% | 10.0% | 84.3% |
| 70 | 5.6% | 10.0% | 84.4% |
| 60 | 5.5% | 10.0% | 84.5% |
| 50 | 5.4% | 10.0% | 84.7% |
| 40 | 5.2% | 10.0% | 84.8% |
| 30 | 5.0% | 10.0% | 85.0% |
| 20 | 4.8% | 10.0% | 85.2% |
| 10 | 4.6% | 9.9% | 85.5% |

It has been determined that a change of just 1% w/w in the amount of $CO_2$ in the blend results, approximately, in a 5% change in cooling capacity. It is also evident from the data in the above table that the amount of $CO_2$ in the blend falls by more than 1% after removing 60 Kg of the initial 80 Kg charge. Thus, for automotive air conditioning systems, the full contents of this cylinder could not be used in compliance with SAE standard J1658, because the composition shift is too great.

Example 3

The same $CO_2$/R-134a/R-1234ze(E) composition as used in Comparative Example 2 was used in this example for continuity. A simulation model was used to illustrate the periodic addition of most volatile component ($CO_2$) after removal of a fixed aliquot of liquid. The same thermodynamic model as previously described was employed.

The simulation was carried out as follows:
1. Firstly a known mass (80 kg) of the ternary blend in a specified composition (6%/10%/84% w/w) was assumed charged to a volume (100 litres) and the liquid and vapour phase compositions, phase densities and masses of liquid and vapour were calculated. The vapour pressure in the tank was noted.
2. An aliquot of the liquid phase was assumed to be withdrawn rapidly—so that the composition of the phases did not change.
3. The equilibrium phase compositions and vapour pressure were recalculated. It was found that the liquid phase composition was slightly depleted in $CO_2$ and the vapour pressure was lower.
4. A small mass of $CO_2$ was then assumed to be added to the tank and the phase equilibrium recalculated.
5. Steps 3 and 4 were repeated by trial and error, varying the amount of $CO_2$ addition, until the pressure in the tank matched the original pressure estimated in step 1. The liquid compositions at this point were recorded
6. Next the iteration returned to step 2 and was repeated until there was negligible amount of liquid phase calculated to remain in the tank.

The results of this calculation are shown graphically in FIG. 1. In this figure the estimated $CO_2$ composition in the liquid phase throughout depletion of the tank is plotted against mass of liquid remaining in the tank. The results found from the previous simulation are plotted as a comparison.

It is found that the method of the invention maintains the $CO_2$ content in the liquid phase close to the original. The compositions of R-134a and R-1234ze(E) in the liquid phase in this example also remain close to their initial values.

The liquid phase compositions at the start and end of the simulated liquid withdrawal process were found to be as follows:

| Total tank contents (kg) | Mass in liquid phase (kg) | $CO_2$ in liquid (% w/w) | R134a in liquid (% w/w) | R1234ze(E) in liquid (% w/w) |
|---|---|---|---|---|
| 80 | 78.6 | 5.68% | 9.99% | 84.33% |
| 9 | 4.8 | 5.68% | 9.73% | 84.59% |

The performance of the initial and final liquid compositions in the tank was then evaluated in a simulated air conditioning cycle and compared to R-134a. NIST REFPROP software, version 8 was used for the study, together with the thermodynamic modelling discussed above.

The study was conducted using the following input conditions for R-134a. The blend performance was modelled using the same input assumptions, except that the compressor displacement was adjusted to 82 cc to match the cooling capacity of R-134a with the Jun. 10, 1984 $CO_2$/R-134a/R-1234ze(E) composition.

| | |
|---|---|
| Mean condenser temperature | 55° C. |
| Mean evaporator temperature | 5° C. |
| Condenser subcooling | 5K |
| Evaporator superheat | 5K |
| Evaporator pressure drop | 0.40 bar |
| Suction line pressure drop | 0.40 bar |
| Condenser pressure drop | 0.50 bar |
| Compressor displacement | 91 cc |
| Compressor speed | 4000 rpm |
| Compressor suction temperature | 20 |
| Isentropic efficiency | 65% |

The results are tabulated below. It is found that the performance is essentially unchanged through the entire removal process.

| Results | R-134a | Initial liquid | Final liquid |
|---|---|---|---|
| Coefficient of Performance COP | 2.29 | 2.35 | 2.35 |
| COP relative to Reference | 100.0% | 102.6% | 102.6% |
| Achieved cooling capacity (kW) | 9.43 | 9.29 | 9.28 |
| Capacity relative to reference | 100.0% | 98.5% | 98.4% |
| Suction pressure drop relative to reference | 100.0% | 83.9% | 83.8% |
| Compressor suction pressure (bar a) | 2.90 | 3.03 | 3.03 |
| Compressor discharge pressure (bar a) | 15.2 | 17.0 | 17.0 |

It can be seen from the above results, that the method of the present invention makes it possible to remove liquid aliquots from a bulk liquid refrigerant composition of $CO_2$, R-134a and R1234ze(E) stored in a container and still maintain a liquid composition in the container that retains a similar composition and performance to the initial composition.

This shows that it would be possible for example to: prepare a bulk stock tank composition by the method of the invention; to then fill multiple air conditioner units on a production line from the tank, and to use most of the tank liquid contents with confidence that the composition delivered to each system remained within desired tolerance limits.

What is claimed is:
1. A method for preparing a ternary or higher zeotropic refrigerant mixture comprising carbon dioxide, at least one hydrofluoroalkene, and optionally at least one further hydrofluorocarbon compound selected from the group consisting of pentafluoroethane (R-125), difluoromethane (R-32), 1,1,1,2-tetrafluoroethane (R-134a) and 1,1-difluoroethane (R-152a), said method comprising:

mixing together the at least one hydrofluoroalkene and optionally the at least one hydrofluorocarbon compound in a pre-blending process; and separately adding the carbon dioxide to the pre-blended mixture by pressure or mass flow control so as to obtain a desired initial liquid composition of the zeotropic refrigerant mixture.

2. The method of claim 1, wherein the hydrofluoroalkene is a hydrofluoropropene.

3. The method of claim 2, wherein the mixture comprises one or more compounds selected from the group consisting of 2,3,3,3-tetrafluoropropene (R-1234yf), 1,3,3,3-tetrafluoropropene (R-1234ze), 3,3,3-trifluoropropene (R-1243zf), and 1,2,3,3,3-pentafluoropropene (R-1225ye).

4. The method of claim 1, wherein the zeotropic refrigerant mixture comprises at least one further hydrofluorocarbon compound selected from the group consisting of pentafluoroethane (R-125), difluoromethane (R-32), 1,1,1,2-tetrafluoroethane (R-134a) and 1,1- difluoroethane (R-152a).

5. A method for preparing a ternary or higher zeotropic refrigerant mixture comprising carbon dioxide, at least one hydrofluoroalkene, and optionally at least one further hydrofluorocarbon compound selected from the group consisting of pentafluoroethane (R-125), difluoromethane (R-32), 1,1,1,2-tetrafluoroethane (R-134a) and 1,1-difluoroethane (R-152a), and then transferring the prepared mixture from a container in which it is held to another container or to a piece of equipment that is to use the refrigerant mixture, said method comprising the steps of:

mixing together the at least one hydrofluoroalkene and optionally the at least one hydrofluorocarbon compound in a pre-blending process;

separately adding the carbon dioxide to the pre-blended mixture by pressure or mass flow control so as to obtain a desired initial liquid composition of the zeotropic refrigerant mixture;

removing at least a portion of the prepared liquid zeotropic refrigerant mixture from a container in which it is held;

charging the liquid zeotropic refrigerant mixture that is removed to another container or to a piece of equipment in which it is to be used; and adding at least carbon dioxide to the holding container to compensate for the removal of liquid refrigerant mixture therefrom.

6. The method of claim 5, wherein the hydrofluoroalkene is a hydrofluoropropene.

7. The method of claim 6, wherein the mixture comprises one or more compounds selected from the group consisting of 2,3,3,3-tetrafluoropropene (R-1234yf), 1,3,3,3-tetrafluoropropene (R-1234ze), 3,3,3-trifluoropropene (R-1243zf), and 1,2,3,3,3-pentafluoropropene (R-1225ye).

8. The method of claim 5, wherein the zeotropic refrigerant mixture comprises at least one further hydrofluorocarbon compound selected from the group consisting of pentafluoroethane (R-125), difluoromethane (R-32), 1,1,1,2-tetrafluoroethane (R-134a) and 1,1-difluoroethane (R-152a).

9. The method of claim 2, wherein the zeotropic refrigerant mixture comprises at least one further hydrofluorocarbon compound selected from the group consisting of pentafluoroethane (R-125), difluoromethane (R-32), 1,1,1,2-tetrafluoroethane (R-134a) and 1,1-difluoroethane (R-152a).

10. The method of claim 3, wherein the zeotropic refrigerant mixture comprises at least one further hydrofluorocarbon compound selected from the group consisting of pentafluoroethane (R-125), difluoromethane (R-32), 1,1,1,2-tetrafluoroethane (R-134a) and 1,1-difluoroethane (R-152a).

11. The method of claim 6, wherein the zeotropic refrigerant mixture comprises at least one further hydrofluorocarbon compound selected from the group consisting of pentafluoroethane (R-125), difluoromethane (R-32), 1,1,1,2-tetrafluoroethane (R-134a) and 1,1-difluoroethane (R-152a).

12. The method of claim 7, wherein the zeotropic refrigerant mixture comprises at least one further hydrofluorocarbon compound selected from the group consisting of pentafluoroethane (R-125), difluoromethane (R-32), 1,1,1,2-tetrafluoroethane (R-134a) and 1,1-difluoroethane (R-152a).

* * * * *